H. BACHARACH.
GAGE.
APPLICATION FILED MAR. 1, 1919.

1,358,692. Patented Nov. 16, 1920.
2 SHEETS—SHEET 1.

INVENTOR
Herman Bacharach
by
James C. Bradley
Atty

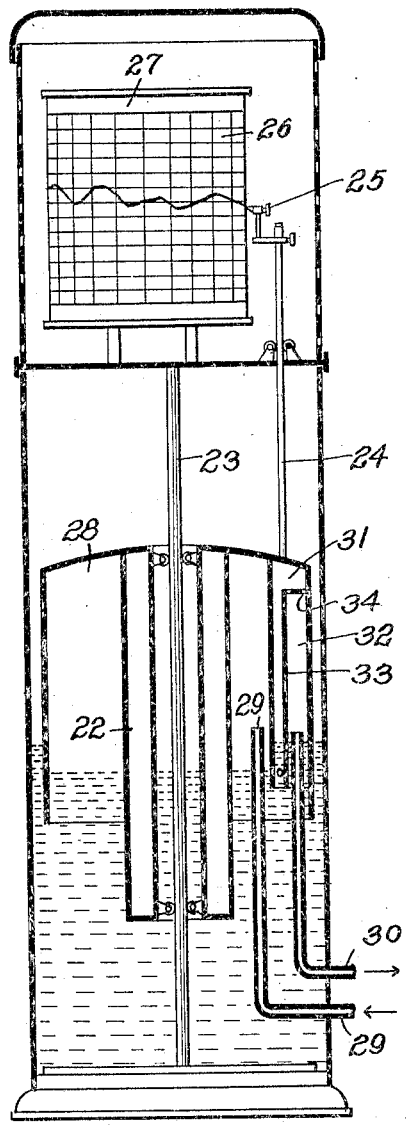
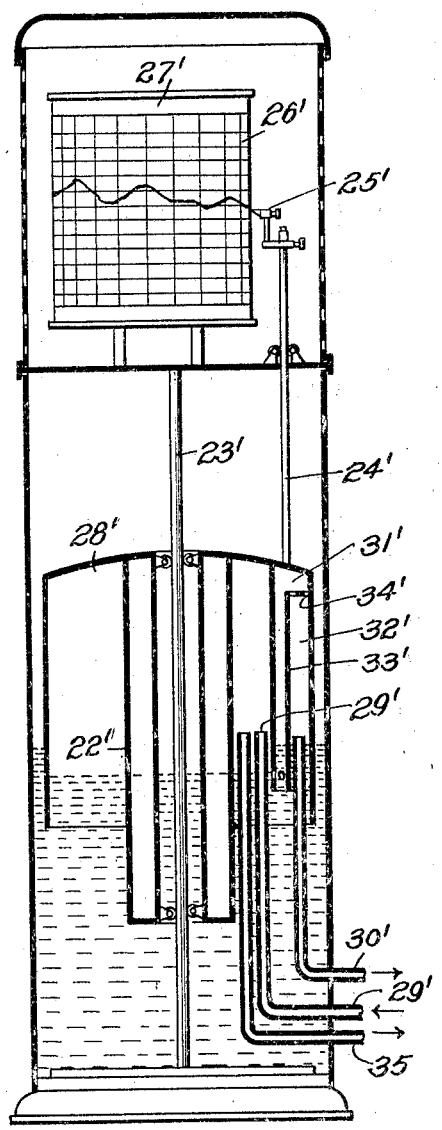

UNITED STATES PATENT OFFICE.

HERMAN BACHARACH, OF PITTSBURGH, PENNSYLVANIA, ASSIGNOR TO BACHARACH INDUSTRIAL INSTRUMENT COMPANY, OF PITTSBURGH, PENNSYLVANIA, A CORPORATION OF PENNSYLVANIA.

GAGE.

1,358,692.   Specification of Letters Patent.   Patented Nov. 16, 1920.

Application filed March 1, 1919. Serial No. 280,157.

*To all whom it may concern:*

Be it known that I, HERMAN BACHARACH, a citizen of the United States, residing at Pittsburgh, in the county of Allegheny and State of Pennsylvania, have invented certain new and useful Improvements in Gages, of which the following is a specification.

Figure 1:
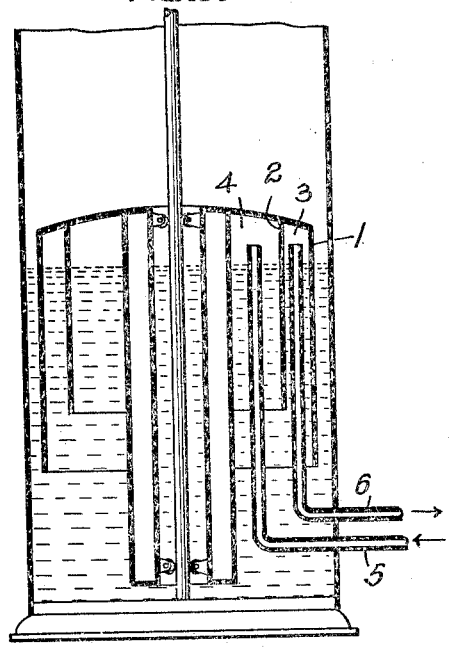
Figure 2:
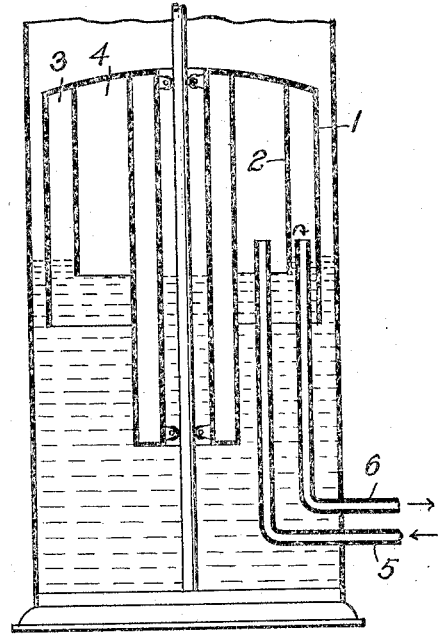
Figure 3:
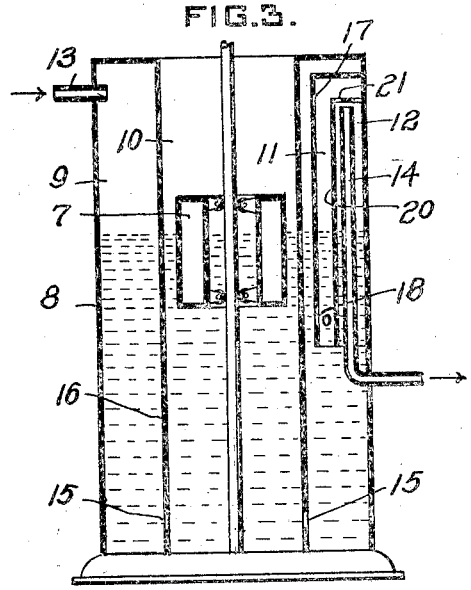
Figure 4:
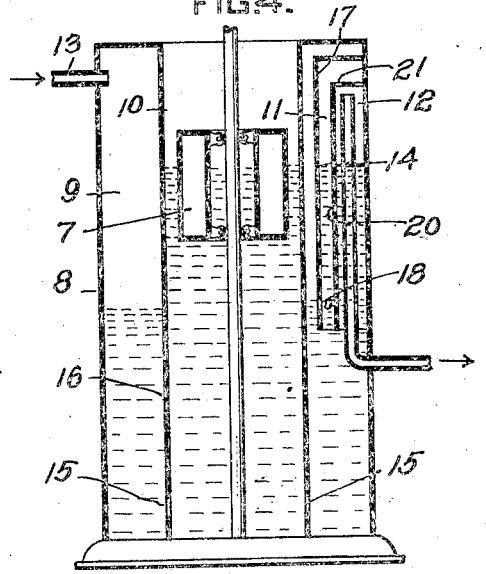

The invention relates to indicating or recording gages. The device as employed with a gage serves to limit the movement of the float so that only those pressures lying between predetermined limits are recorded. The record of extreme variations of pressure is in many cases unimportant, while it is important to magnify the record within certain predetermined limits, and one purpose of the invention as applied to recording gages is to permit of any desired magnification of a limited portion of the record of the float upon a card or recording ribbon of the usual width. A further object is to accomplish the result stated by the use of a cheap, simple device applicable to the ordinary hydrostatic gage, wherein a float moves relative to the liquid upon variations in pressure or wherein the float moves with the liquid. A still further object is to provide a hydrostatic gage device wherein the escape of gas when the pressure rises above a predetermined point, is rendered harmless, such gas being conducted to a point remote from the gage, instead of escaping in the gage itself, and thereby endangering the attendants near the instrument, and in some cases injuring the mechanism of the recording device used with the gage. Certain embodiments of the invention are illustrated in the accompanying drawing wherein:

Figures 1 and 2 are sectional diagrammatic views showing one form of float in two positions of use. Figs. 3 and 4 are sectional views of a modified construction in two positions of use. Fig. 5 is a sectional view of an improvement over the construction of Figs. 1 and 2, but with an indicating device attached to the float. And Fig. 6 is a view similar to that of Fig. 5 but including an additional feature for providing a supply of gas at a substantially constant pressure.

Figs. 1 and 2 illustrate the invention as applied in its simplest form and without the indicator device with which the float is usually employed. The float comprises a pair of concentric inverted bells, 1 being the wall of the outer bell and 2 the wall of the inner bell. Two chambers 3 and 4 are thus provided, with the wall 2 separating such chambers, of less depth than the outer wall 1. Pressure is supplied to the inner chamber through the pipe 5, while the outer chamber is provided with a release or outlet pipe 6 leading to the atmosphere at a point remote from the instrument.

In case the pressure from the pipe 5 rises above a predetermined point the float assumes the position of Fig. 2 permitting an escape of gas past the lower edge of the wall 2 to the chamber 3 and thence to the pipe 6. This outlet serves to limit the vertical movement of the float so that if the device is used with an indicator, the record may be restricted within any desired limits and the record as to extreme movements of the float dispensed with. Further any gas which may escape due to excessive pressure is conducted to a point remote from the instrument, thus avoiding any danger to attendants or to the mechanism which may be employed with the recording device.

Figs. 3 and 4 illustrate the extreme positions of a float device in which the variations in gas pressure cause variations in the level of the liquid and in which the float moves with the liquid instead relative thereto, as is the case in the construction of Figs. 1 and 2. In this construction 7 is the float to which the indicating device, (not shown), may be connected. The liquid in the casing 8 has access to the four chambers 9, 10, 11 and 12; 9 being the chamber to which the gas pressure is supplied through the pipe 13; 10 being the chamber carrying the float 7; 11 being the chamber to which the release of pressure occurs; and 12 being a guard chamber surrounding the release or outlet pipe 14. The chambers 9 and 10 communicate by means of the openings 15 through the wall 16. The wall 17 between the chambers 9 and 11 is perforated as indicated at 18 to permit of a release of pressure before the level of the liquid reaches the lower edge of the wall. The wall 20 which surrounds the pipe 14 serves to guard against the entrance of liquid to the pipe 14, such as might accompany a sudden flow of gas through the chamber 11 and into the pipe. The top wall of the chamber 12 is perforated at 21, and such perforations are located out of alinement with the pipe 14 so that any liquid which may be carried along to this point with the gas will drip into the chamber 12 without entering the pipe. It will be seen that the functions and advantages incident to the release pipe are the same as with the other type of device.

Fig. 5 illustrates still another modification involving the use of the guard chamber of the Figs. 3 and 4 construction on the construction of Figs. 1 and 2 and also the application of a recording device to register the movements of the float. As here shown the float 22 is guided on the rod 23 and is provided with a rod 24 carrying the marking pen 25. This pen marks upon the record 26 carried by the drum 27, the drum being rotated by suitable clock work or other rotating motor.

Pressure is supplied to the chamber 28 of the float by the pipe 29, while the release pipe 30 serves to conduct the gas from the chamber 31 when the pressure reaches a point sufficient to bring the float to the position illustrated. The pipe 30 is surrounded by a guard chamber 32 as in the construction of Figs. 3 and 4, the wall 33 of the chamber being perforated at its upper portion as indicated at 34.

Fig. 6 illustrates a construction very similar to that of Fig. 5, except that the additional pipe 35 is employed, the parts $22^1$ to $34^1$ inclusive being just the same in construction as the parts 22 to 34 of Fig. 5. This device not only records variations in pressure in the source of supply from which the pipe $29^1$ leads, but also serves to provide pressure in the pipe 35 which is constant within relatively narrow limits, and which shall always be below a predetermined limit. The float is so adjusted that when the pressure rises above the predetermined point desired in the pipe 35 the parts assume the position illustrated permitting a release of pressure from the chamber $28^1$. At such time the gas may escape to the chambers $31^1$ and $32^1$ and thence through the release pipe $30^1$.

What I claim is:

1. In combination in a gage, a pair of inverted chambers and a sealing body of liquid therefor so arranged that the level of the liquid is so changed with respect to the chambers that such chambers are brought into communication when a predetermined pressure is applied to one of the chambers, a release passage leading from above the level of the liquid in the other chamber, and a recording device operated by the relative movement of the said chambers and liquid.

2. In combination in a gage, a body of liquid, a pair of inverted chambers mounted for vertical movement in the liquid, and brought into communication when the chambers are raised a predetermined amount, an inlet to one chamber, an outlet from the other chamber, and a recording device operated by the movement of the chambers.

3. In combination with a pair of chambers and a body of liquid adapted to normally seal off communication between the two chambers, a passage leading to one chamber, a release pipe extending above the surface of the liquid in the other chamber, an inverted guard chamber sealed by the liquid surrounding the pipe and communicating with said other chamber, the liquid and chambers being so arranged that a communication past the liquid and between the first two chambers is established when the pressure in the first chamber rises above a predetermined point.

4. In combination with a pair of chambers and a body of liquid adapted to normally seal off communication between the two chambers, a passage leading to one chamber, a release pipe extending above the surface of the liquid in the other chamber, an inverted guard chamber sealed by the liquid surrounding the pipe and being perforated at its upper portion so as to communicate with said other chamber, the liquid and chambers being so arranged that a communication past the liquid and between the first two chambers is established when the pressure in the first chamber rises above a predetermined point.

HERMAN BACHARACH.